(12) United States Patent
Hastings

(10) Patent No.: US 7,181,587 B1
(45) Date of Patent: Feb. 20, 2007

(54) MAPPING AN ARBITRARY NUMBER OF CONTIGUOUS MEMORY PAGES AT AN ARBITRARY ALIGNMENT

(75) Inventor: Andrew B. Hastings, Eagan, MN (US)

(73) Assignee: Cray Inc., Seattle, WA (US)

( * ) Notice: Subject to any disclaimer, the term of this patent is extended or adjusted under 35 U.S.C. 154(b) by 381 days.

(21) Appl. No.: 10/643,580

(22) Filed: Aug. 18, 2003

(51) Int. Cl.
*G06F 12/08* (2006.01)

(52) U.S. Cl. ...................... 711/171; 711/209

(58) Field of Classification Search ............... 711/171, 711/209
See application file for complete search history.

(56) References Cited

U.S. PATENT DOCUMENTS

| | | | | |
|---|---|---|---|---|
| 5,450,558 A | * | 9/1995 | Ludwig | 711/208 |
| 5,568,415 A | * | 10/1996 | McLellan et al. | 365/49 |
| 6,374,341 B1 | * | 4/2002 | Nijhawan et al. | 711/207 |
| 6,446,186 B1 | * | 9/2002 | Priem et al. | 711/206 |
| 6,560,688 B1 | * | 5/2003 | Strongin et al. | 711/203 |
| 6,981,120 B1 | * | 12/2005 | Barrus et al. | 711/200 |
| 2003/0037060 A1 | * | 2/2003 | Kuehnel | 707/103 R |

OTHER PUBLICATIONS

Ganapathy, N., "General Purpose Operating System Support for Multiple Page Sizes", *Proceedings of the USENIX Annual Technical Conference (NO 98)*, New Orleans, Louisiana, Jun. 1998, 14 pages.

* cited by examiner

*Primary Examiner*—Tuan V. Thai
*Assistant Examiner*—Shane M. Thomas
(74) *Attorney, Agent, or Firm*—Schwegman, Lundberg, Woessner & Kluth, P.A.

(57) ABSTRACT

Virtual memory is mapped to physical memory in a computerized system. Two or more contiguous pages in virtual memory to be mapped to physical memory are identified, and the size in pages of the two or more contiguous pages is determined. An alignment in pages is determined for the two or more contiguous pages of virtual memory, and a free bit data structure is searched to locate a free section of contiguous physical memory having the desired size and alignment. The two or more pages of virtual memory are then mapped via a single mapping to located free section of contiguous physical memory.

15 Claims, 3 Drawing Sheets

PF DAT

| PAGE | 0 | 1 | 2 | 3 | 4 | 5 | 6 |
|---|---|---|---|---|---|---|---|
| FREE BIT 0 | 0 | 1 | 0 | 0 | 1 | 1 | ... |

MAPPING AN ARBITRARY NUMBER OF CONTIGUOUS MEMORY PAGES AT AN ARBITRARY ALIGNMENT

FIELD OF THE INVENTION

The invention relates generally to memory management in computers, and more specifically to virtual mapping of free memory pages.

BACKGROUND OF THE INVENTION

A typical computer system will use as much memory as can be afforded, and will benefit from having fast access to whatever memory is available. Because a large amount of memory is expensive, as is memory that is particularly fast, a memory hierarchy of different speed and size memories has become the common method of handling data storage in modern computer systems.

The fastest memory is generally used in cache, which is a place where certain data predicted likely to be used again soon is stored. Cache typically doesn't store unique data, but stores a more quickly accessible copy of data stored in other, slower memory. Because cache is the fastest memory in most systems, it is also the most expensive and is therefore relatively limited in size. More sophisticated computer systems have multiple levels of cache, with faster levels having smaller storage capacity than slower, larger levels.

Main memory itself is often not large enough to store all the data that even a typical personal computer will use when executing multiple or large programs. When the computer system needs to store more data than will fit in the physical memory in the computer system, the excess data is stored to disk. When a data element stored on disk is needed, a memory page fault occurs. The memory page containing the needed data is then loaded from hard disk storage into memory after another page is written to disk to make room for the newly loaded memory page.

Organizing memory into pages is also useful in that it allows the computer system to address memory by using virtual addresses, with special components such as a translation lookaside buffer (TLB) able to map virtual addresses to particular pages, whether stored in memory or on disk. This allows the computer system to address more memory than is physically available, using virtual addresses that are translated into physical addresses and specific pages by the memory management system.

Further, each separate process running on modern computer systems also typically has its own address space. Because it would be too expensive to allocate a full address space worth of physical memory to each process, virtual memory is used to divide the physical memory into blocks such as pages, and to coordinate sharing of the actual physical memory. Protection schemes ensure that each process accesses only that memory that is allocated to the process, and generally are implemented in hardware and software along with other page management algorithms.

The mapping of virtual memory into physical memory is stored in a data structure, along with other information such as protection data and use data. This data structure is often part of the translation lookaside buffer or TLB, which is itself of limited size due to the need for rapid access. Increasing the size of the TLB would enable more mapping data to be stored, but at additional size, power, and monetary costs. A more practical solution is to enable mapping more than one page at a time with a single mapping entry where consecutive pages of virtual memory are mapped to consecutive pages of physical memory.

It is desired to more efficiently manage virtual memory mapping.

SUMMARY OF THE INVENTION

In one embodiment of the invention, a computerized system has a memory management module in which virtual memory is mapped to physical memory. Two or more contiguous pages in virtual memory to be mapped to physical memory are identified, and the size in pages of the two or more contiguous pages is determined. An alignment in pages is determined for the two or more contiguous pages of virtual memory, and a free bit data structure is searched to locate a free section of contiguous physical memory having the desired size and alignment. The two or more pages of virtual memory are then mapped via a single mapping to located free section of contiguous physical memory.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention in one embodiment addresses memory management in a computerized system using virtual memory as well as physical memory to which the virtual memory is mapped. Two or more contiguous pages in virtual memory to be mapped to physical memory are identified, and the size in pages of the two or more contiguous pages is determined. An alignment in pages is also determined for the two or more contiguous pages of virtual memory, and a free bit data structure is searched to locate a free section of contiguous physical memory having the desired size and alignment. The two or more pages of virtual memory are then mapped via a single mapping to located free section of contiguous physical memory.

Figure 1:
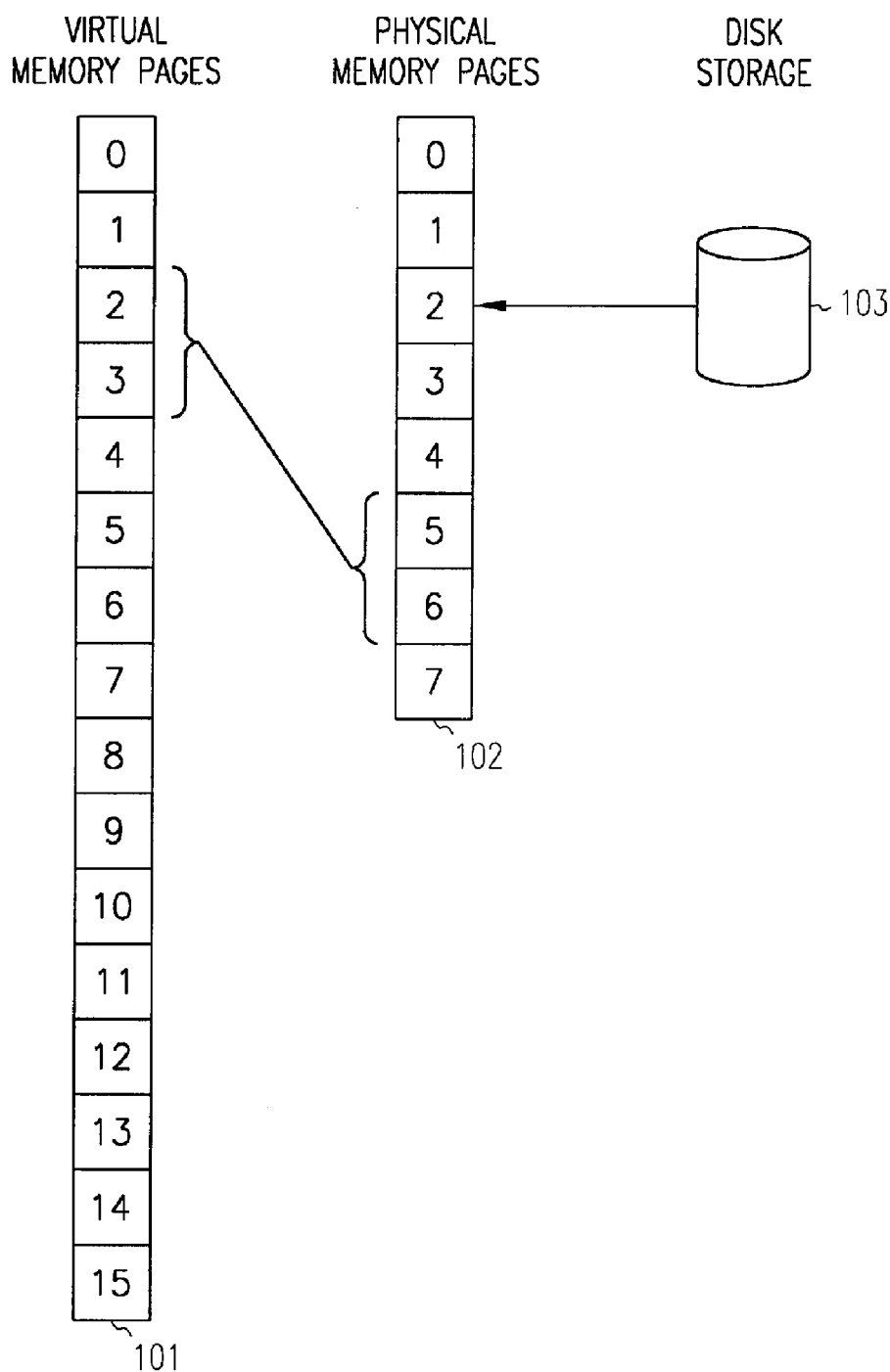
FIG. 1 is a diagram of virtual and physical memory, consistent with an embodiment of the present invention FIG. 2

FIG. 1 is a diagram of virtual and physical memory, consistent with an embodiment of the present invention. It shows a simplified virtual addressable memory structure 101 having 15 pages, mapped to physical memory 102 having eight pages. Memory pages that are addressable in virtual memory but that are not presently stored in physical memory may be stored in disk storage 103, and swapped into physical memory as it is needed. Other virtually addressable memory pages, such as pages two and three, are mapped to physical memory pages, such as pages five and six, as indicated in FIG. 1. Traditionally, memory mapping records such as a Translation Lookaside Buffer (TLB) are used to map virtual memory addresses to physical memory addresses, and to manage the mapping of single pages of virtual memory into single pages of physical memory. The TLB is desirably a very fast and consequently expensive memory, such as a small amount of very fast static random access memory (SRAM) located physically near the other components that provide memory control functions.

The present invention in some embodiments extends this virtual memory mapping concept, and facilitates mapping multiple contiguous pages of virtual memory to multiple contiguous pages of physical memory with a single memory mapping. This reduces the size requirements of the TLB and other such memory mapping records, allowing less expensive design and more efficient operation.

To create a new mapping of virtual memory into physical memory, a sufficient amount of physical memory must be found, and must be addressable by the memory mapping system. Some embodiments of a multiple page memory mapping system require both that the required number of contiguous free pages in physical memory be found, and that the required number of contiguous free pages be in a proper position or alignment in the physical memory, where alignment refers to where the block of free physical memory pages starts. For example, a virtual memory mapping to physical memory having a page size of two and an alignment of four could only be mapped to physical memory starting on pages beginning with an integer multiple of four. In FIG. 1, this includes only physical memory pages 0 and 4, meaning that either pages 0–3 could be mapped to the virtual memory, or pages 4–7 could be mapped to the virtual memory.

Some embodiments of a virtual memory mapping system require that the alignment and page size be the same. The memory mapping shown in FIG. 1 does not, as the two virtual memory pages 2 and 3 are mapped to physical memory pages 5 and 6, and are therefore do not have an alignment of two. The next Figures will show in greater detail how an embodiment of the present invention facilitates mapping a given number of pages that are not necessarily the same as a given alignment.

Figures 2, 3, 4:
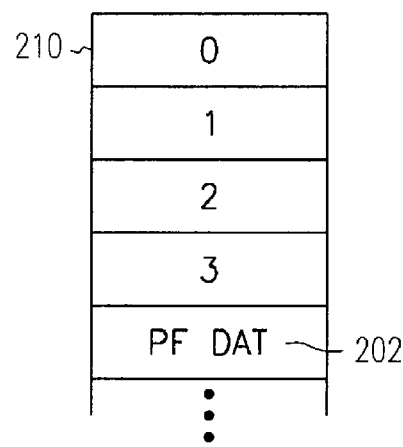
FIG. 2 is a diagram of physical memory, showing a page structure having a size of 64 kiloBytes (64 k) per page, consistent with an embodiment of the present invention.
FIG. 3 shows a PFDAT table, consistent with an embodiment of the present invention.
FIG. 4 shows a 64-bit word comprising PFDAT free bit data, consistent with an embodiment of the present invention.

FIG. 2 is a diagram of physical memory, showing a page structure having a size of 64 kiloBytes (64 k) per page. Page four of memory is here used to store a page status table data structure called a PFDAT, which in an embodiment of the invention is used to store page-related data such as computer process association and whether the page is free. The page free information is indicated by a free bit associated with each page, as shown in the PFDAT table of FIG. 3. The free bits in this example are a one if the page is free, and a zero if the page is not free. Because the PFDAT itself is stored in page four, page four's free bit is a zero, indicating that the particular page of physical memory is not free.

The free bit data is extracted from the PFDAT data structure and compiled into at least one word containing the free bits. Such a word is shown in FIG. 4, which shows a 64-bit word that starts with the PFDAT free bit data shown in FIG. 3. The word or words containing the free bit data are then evaluated to locate a section of contiguous free bits that corresponds to the desired number of pages or page size and alignment for the virtual memory to be mapped.

Searching the free bits is performed in some embodiments of the invention by first searching each word with a population count instruction. Such an instruction evaluates the bits in a word, and returns either the number of bits that are ones, or the number of bits that are zeros. Either result will indicate the number of free bits in the word, and suggest whether a word is certain to represent enough free pages to fulfill the mapping request, certain to not represent enough free pages to fulfill the request, or uncertain. If the population count indicates that 62 of the 64 represented pages are not free, a four-page contiguous mapping to those pages can be determined to be not possible. Similarly, if only a few of the 64 represented pages are not free, a four-page contiguous mapping can be determined to be possible. But, if half the 64 bits are free, it is not known how the free pages are distributed among the sequential pages, and it cannot be determined with certainty whether there is a contiguous block of four free pages in the 64 pages represented without further processing of the free bits.

Another instruction that may be used to quickly locate a sufficient number of free bits within a word populated with sequential free bits is a leading zero count. A similar instruction, a mask first one instruction, locates the first one in a word. Either instruction can be used to quickly scan for a required number of leading zeros in a word. Because leading zeros represent used pages and not free pages, some embodiments of the invention using these instructions will invert all bits of the word before issuing such bit count instructions. The result will then indicate a leading number of free pages represented by the word's free bits, which is more directly useful than knowing the number of pages that are not free. If a page is found that has twelve free pages, for example, our four-page mapping can be easily performed as long as the desired alignment is not greater than eight.

In other embodiments of the invention, other similar instructions, such as a leading one count or a mask first zero may be used. In further embodiments of the invention, instructions such as those discussed here are vector instructions, and perform their operations on several 64-bit words with a single issue of the instruction, enabling more rapid processing of a large number of 64-bit words of free bits. Searching the words may be performed at the same time in embodiments of the invention where the computer has multiple processors, or where a processor has multiple functional units needed to execute the instruction.

If sufficient free space is not located by using the instructions described above, words that may have sufficient contiguous free pages are searched bit-by-bit for the required number of consecutive free pages. Where an alignment other than one is specified, searching starts only from pages having the proper alignment, and upon finding a non-free page resumes at the next alignment page. In systems having a mask first one instruction that finds the first one in a word such as is described above, the first free page of a 64-bit word can be located and searching can be started from the first alignment point on or after the first free page. This saves time, in that bits that are determined not to represent free pages can be skipped rather than counted in the consecutive free page counting process.

Figure 5:
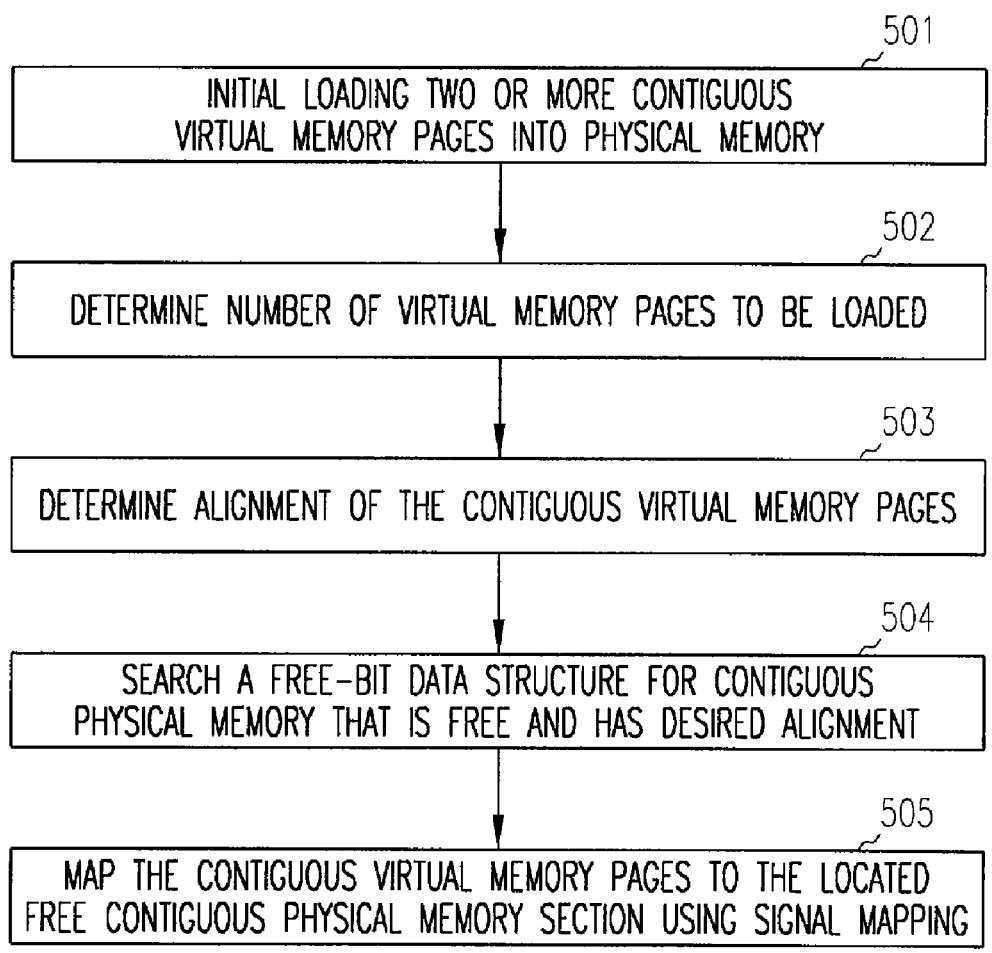
FIG. 5 is a flowchart of a method of mapping contiguous virtual memory pages into physical memory, consistent with an example embodiment of the invention.

FIG. 5 is a flowchart, showing a method of practicing one example embodiment of the invention. At 501, a memory transfer from virtual memory into physical memory is initiated, such as by a software application using data stored in the virtual memory space. The number of contiguous virtual memory pages to be loaded into physical memory is determined at 502, and the alignment of the contiguous virtual memory pages is determined at 503. A data structure comprising free bit information for the physical memory pages is searched at 504 to locate free space in physical memory having a sufficient number of contiguous free pages and the desired alignment. When sufficient free space is found or made available in physical memory, such as by unloading some pages to make room for the newly requested memory pages, the contiguous virtual memory pages are mapped into contiguous physical memory using a single mapping at 505.

The examples of the present invention described herein in conjunction with the Figures show how pages of virtual memory can be mapped to pages of free physical memory, using any arbitrarily determined size and alignment. Although the examples here use a single page size of 64 k, a word size of 64 bits, and consider use of specific instructions to perform free page bit searching, other embodiments of the invention will use different system configurations. It will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of mapping virtual memory to physical memory, comprising:
   identifying two or more contiguous pages in virtual memory to be mapped to physical memory;
   determining a size in pages of the two or more contiguous pages of virtual memory;
   determining an alignment in pages of the two or more contiguous pages of virtual memory;
   searching a free bit data structure to locate a free section of contiguous physical memory having the desired size and alignment; and
   mapping the two or more pages in virtual memory to the located free section of contiguous physical memory via a single mapping;
   wherein searching a free bit data structure comprises processing a word comprising free bits using a population count instruction to determine the number of free bits in the word.

2. The method of claim 1, wherein the population count instruction is a vector instruction operable to operate on multiple words per instruction issue.

3. A method of mapping virtual memory to physical memory, comprising:
   identifying two or more contiguous pages in virtual memory to be mapped to physical memory;
   determining a size in pages of the two or more contiguous pages of virtual memory;
   determining an alignment in pages of the two or more contiguous pages of virtual memory;
   searching a free bit data structure to locate a free section of contiguous physical memory having the desired size and alignment; and
   mapping the two or more pages in virtual memory to the located free section of contiguous physical memory via a single mapping;
   wherein searching a free bit data structure comprises processing a word comprising free bits using a leading bit count instruction to determine the number of leading bits of a particular value.

4. The method of claim 3, wherein the leading bit count instruction is a vector instruction operable to operate on multiple words per instruction issue.

5. A method of mapping virtual memory to physical memory, comprising:
   identifying two or more contiguous pages in virtual memory to be mapped to physical memory;
   determining a size in pages of the two or more contiguous pages of virtual memory;
   determining an alignment in pages of the two or more contiguous pages of virtual memory;
   searching a free bit data structure to locate a free section of contiguous physical memory having the desired size and alignment; and
   mapping the two or more pages in virtual memory to the located free section of contiguous physical memory via a single mapping;
   wherein searching a free bit data structure comprises counting consecutive free bits, wherein counting the number of free bits found is started only from bits representing a page number that is an integer multiple of the determined alignment.

6. A memory management system comprising a virtual memory mapping module, the virtual memory mapping module operable to:
   identify two or more contiguous pages in virtual memory to be mapped to physical memory;
   determine a size in pages of the two or more contiguous pages of virtual memory;
   determine an alignment in pages of the two or more contiguous pages of virtual memory;
   search a free bit data structure to locate a free section of contiguous physical memory having the desired size and alignment; and
   map the two or more pages in virtual memory to the located free section of contiguous physical memory via a single mapping;
   wherein searching a free bit data structure comprises processing a word comprising free bits using a population count instruction to determine the number of free bits in the word.

7. The memory management system of claim 6, wherein the population count instruction is a vector instruction operable to operate on multiple words per instruction issue.

8. A memory management system comprising a virtual memory mapping module, the virtual memory mapping module operable to:
   identify two or more contiguous pages in virtual memory to be mapped to physical memory;
   determine a size in pages of the two or more contiguous pages of virtual memory;
   determine an alignment in pages of the two or more contiguous pages of virtual memory;
   search a free bit data structure to locate a free section of contiguous physical memory having the desired size and alignment; and
   map the two or more pages in virtual memory to the located free section of contiguous physical memory via a single mapping;
   wherein searching a free bit data structure comprises processing a word comprising free bits using a leading bit count instruction to determine the number of leading bits of a particular value.

9. The memory management system of claim 8, wherein the leading bit count instruction is a vector instruction operable to operate on multiple words per instruction issue.

10. A memory management system comprising a virtual memory mapping module, the virtual memory mapping module operable to:
- identify two or more contiguous pages in virtual memory to be mapped to physical memory;
- determine a size in pages of the two or more contiguous pages of virtual memory;
- determine an alignment in pages of the two or more contiguous pages of virtual memory;
- search a free bit data structure to locate a free section of contiguous physical memory having the desired size and alignment; and
- map the two or more pages in virtual memory to the located free section of contiguous physical memory via a single mapping;
- wherein searching a free bit data structure comprises counting consecutive free bits, wherein counting the number of free bits found is started only from bits representing a page number that is an integer multiple of the determined alignment.

11. A computerized system having a paged memory system, the paged memory system operable to:
- identify two or more contiguous pages in virtual memory to be mapped to physical memory;
- determine a size in pages of the two or more contiguous pages of virtual memory;
- determine an alignment in pages of the two or more contiguous pages of virtual memory;
- search a free bit data structure to locate a free section of contiguous physical memory having the desired size and alignment; and
- map the two or more pages in virtual memory to the located free section of contiguous physical memory via a single mapping;
- wherein searching a free bit data structure comprises processing a word comprising free bits using a population count instruction to determine the number of free bits in the word.

12. The computerized system of claim 11, wherein the population count instruction is a vector instruction operable to operate on multiple words per instruction issue.

13. A computerized system having a paged memory system, the paged memory system operable to:
- identify two or more contiguous pages in virtual memory to be mapped to physical memory;
- determine a size in pages of the two or more contiguous pages of virtual memory;
- determine an alignment in pages of the two or more contiguous pages of virtual memory;
- search a free bit data structure to locate a free section of contiguous physical memory having the desired size and alignment; and
- map the two or more pages in virtual memory to the located free section of contiguous physical memory via a single mapping;
- wherein searching a free bit data structure comprises processing a word comprising free bits using a leading bit count instruction to determine the number of leading bits of a particular value.

14. The computerized system of claim 13, wherein the leading bit count instruction is a vector instruction operable to operate on multiple words per instruction issue.

15. A computerized system having a paged memory system, the paged memory system operable to:
- identify two or more contiguous pages in virtual memory to be mapped to physical memory;
- determine a size in pages of the two or more contiguous pages of virtual memory;
- determine an alignment in pages of the two or more contiguous pages of virtual memory;
- search a free bit data structure to locate a free section of contiguous physical memory having the desired size and alignment; and
- map the two or more pages in virtual memory to the located free section of contiguous physical memory via a single mapping;
- wherein searching a free bit data structure comprises counting consecutive free bits, wherein counting the number of free bits found is started only from bits representing a page number that is an integer multiple of the determined alignment.

* * * * *